J. ROBINGSON.
Candle Mold.
No. 15,668.
Patented Sept. 2, 1856.
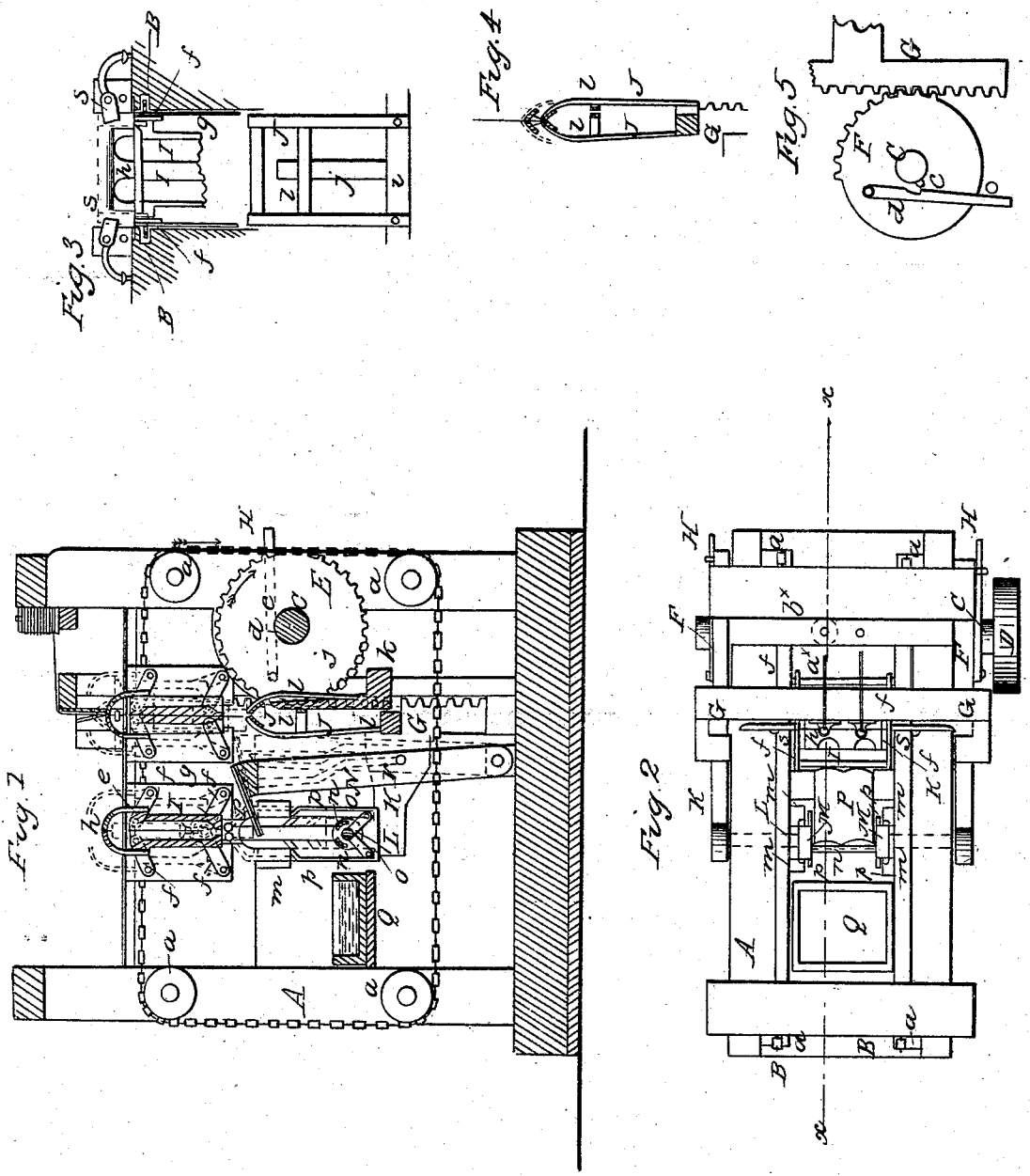

UNITED STATES PATENT OFFICE.

JOHN ROBINGSON, OF NEW BRIGHTON, PENNSYLVANIA.

CANDLE-MOLDING MACHINE.

Specification of Letters Patent No. 15,668, dated September 2, 1856.

*To all whom it may concern:*

Be it known that I, JOHN ROBINGSON, of New Brighton, in the county of Beaver and State of Pennsylvania, have invented a new and Improved Machine for Molding Candles; and I do hereby declare that the following is a full, clear, and exact description of the same, reference being had to the annexed drawings, making a part of this specification, in which—

Figure 1, is a longitudinal vertical section of my improvement; (*x*), (*x*), Fig. 2, showing the plane of section. Fig. 2, is a plan or top view of ditto. Fig. 3, is a detached side view of a pair of molds, and the jaws which open the molds and grasp the wicks. Fig. 4, is a detached transverse section of the jaws. Fig. 5, is a detached side view of one of the pulleys which actuate the jaws or mold openers.

Similar letters of reference indicate corresponding parts in the several figures.

My invention consists in attaching a series of molds to endless chains which have an intermittent motion; said molds when filled passing through a water reservoir which cools the tallow, and also passing and resting or dwelling a suitable time over jaws by which the wicks are drawn through the molds; the molds opened and the candles withdrawn from them and deposited in a proper receptacle, as will be hereinafter fully shown and described.

To enable those skilled in the art to fully understand and construct my invention, I will proceed to describe it.

A, represents a rectangular frame which may be constructed in any proper manner to support the working parts.

B, B, represent two endless chains, which work over pulleys, (*a*,) placed at each side of the machine. There are four pulleys, (*a*,) at each side of the machine, and each chain is consequently in the form of a square, as shown clearly in Fig. 1.

C, represents a shaft which is placed at one end of the machine. This shaft has a driving pulley, D, at one end, and two toothed wheels, E, E, are placed loosely upon it; the wheels, E, being inside the frame, A. There are also two pulleys, F, F, placed loosely on the shaft, C, at the outer sides of the frame, A. These pulleys have a portion of their peripheries cogged or toothed as shown at (*b*), Fig. 5. The wheels, E, E, gear into the endless chains, B, B, and the toothed portions of the pulleys, F, F, gear into racks, G, G, which are fitted in grooves in the frame A.

The wheels, E, E, and pulleys, F, F, are connected at proper intervals with the shaft, C, by means of pins (*c*), on the shaft which catch into notches (*d*), in levers, H, attached to the wheels and pulleys; see Figs. 1 and 5.

To the endless chains, B, B, there are attached a series of molds, I, at suitable and equal distances apart. There are one pair of molds, or two placed side by side, and these molds are divided into two parts, each part or half being attached to bars, (*e*,) the ends of which are secured to arms, (*f*), which are fitted loosely on rods attached to plates, (*g*,) said plates being secured to the chains, B, B. To the upper bars, (*e*,) there are attached curved plates, (*h*,) one to each bar. The upper ends of these plates when the molds are closed are in contact.

The lower parts of the racks, G, G, are connected by a cross bar, (*i*,) to which jaws, J, are attached, and a vertical bar, (*j*,) is attached to a cross piece, (*k*,) in the frame, A; said bar, (*j*), being placed between cross piecs, (*l*,) on the jaws, J, as shown in Figs. 1 and 3.

To the lower end of each rack, G, there is attached an arm, K, the outer ends of which are connected by a rod, L, which passes through two vertical slotted bars, M, which are fitted and slide between guides, (*m*,) in the frame, A. On the rod, L, there is placed two jaws, (*n*,) (*n*,) of curved form, as shown in Fig. 1. These jaws have shanks or arms, (*o*,), (*o*,), attached to them at each end, and the lower ends of the shanks or arms work in guides, (*p*,) attached to the bars, M, and also work in the slots in the bars.

N, N, represent two bars, the lower ends of which are pivoted to the frame, A. The bars, N, have each a zig-zag groove (*q*,) made in their outer sides in which pins, (*r*), on the arms, K, fit. The upper ends of the bars, N, N, are connected by a cross piece, O, which has an incline plate, P, attached to it at about its center.

The operation is as follows: Suppose the several molds, I, to be empty. The several molds as they reach a point in line over the jaws, J, rest or dwell, in consequence of the pins, (*c*), and levers, H, on the wheels E, and the teeth or cogs on the pulleys F, gear into the racks, G, and raise the jaws, J, which part or separate the two parts of the mold; the jaws ascending and grasping the ends of the wicks, ($a^x$,) which are placed upon bobbins ($b^x$) on the upper part of the frame, A. The jaws are then allowed to descend, either by their own gravity or by any proper device; the teeth on the pulleys, F, passing out of gear with the racks G. The jaws draw the wicks down through the molds, the jaws when depressed or lowered being opened by the bar ($j$), and the wicks above the molds being cut off; the molds being previously filled with tallow. The molds pass along in the direction indicated by the arrow, and pass through a reservoir of water (not shown), arranged in any proper manner and placed in the lower part of the framing. The water cools the tallow, and as the several molds reach a point directly over the jaws ($n$), ($n$), on the rod, L, said jaws and bars, M, are raised by the arms, K; the bars, M, being elevated sufficiently to open the molds, I; and the jaws, ($n$), ($n$), grasp the ends of the candles and as they descend draw them from the molds; the plate, P, moving forward at the same time and throwing the candles into a receptacle, Q, prepared to receive them.

The jaws ($n$), ($n$), are opened and closed by the shanks ($o$), ($o$), which, as they ascend, work in the guides ($p$), and as they descend work in the slots in the bars, M.

The jaws, J, are opened to receive the wicks ($a^x$), by means of levers or arms ($s$), ($s$), attached to the upper part of the frame; see Figs. 2 and 3.

The jaws, J and ($n$), ($n$), move upward simultaneously as there is a pair of molds over each pair of jaws; and the chains, B, B, at each movement pass along the length of the space between the two pairs of jaws.

Having thus described my invention, what I claim as new, and desire to secure by Letters Patent, is,

1. Attaching a series of molds, I, to endless chains, B, B, which have an intermittent movement; the molds being formed of two parts and opened and closed at the proper time by the jaws, J, operated as shown, for the purpose specified.

2. I also claim drawing the candles from the molds by means of the jaws, ($n$), ($n$), attached to the rod, L, arranged and operating as shown, for the purpose specified.

3. I further claim, in connection with the jaws, ($n$), ($n$), the plate P, operating as shown, for the purpose of turning or conveying the candles into the receptacle, Q.

JOHN ROBINGSON.

Witnesses:
C. R. TUTTLE,
J. M. TUTTLE.